Patented Aug. 7, 1928.

1,680,020

UNITED STATES PATENT OFFICE.

WILLIAM HARRISON, OF MANCHESTER, ENGLAND.

PRODUCTION OF CARBOHYDRATE COMPOUNDS.

No Drawing. Application filed October 4, 1926, Serial No. 139,559, and in Great Britain October 24, 1925.

This invention relates to improvements in the manufacture of carbohydrate compounds.

It is known that when carbohydrate xanthogenates such as cellulose xanthogenate (viscose) or starch xanthogenate are treated with certain weak oxidizing agents such as a solution of iodine in the presence of a weak acid potassium ferricyanide, sodium ferricyanide or copper salts, precipitation takes place, the reaction being generally supposed to be represented by one of the following equations:—

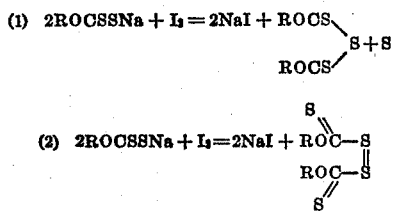

The reaction cannot be carried out with all oxidizing agents, since such compounds as sodium hypochlorite, hydrogen peroxide and potassium permanganate split off the carbohydrate component.

The oxidizing agents which can be employed are costly as in the case of iodine or a very large amount is necessary as in the case of a ferricyanide and consequently the compound formed has been very costly to produce and has therefore found little or no commercial application.

The object of the present invention is to produce the same or similar compound in a simpler, cheaper and more practical manner so that the compound or compounds can be produced commercially and be used in industry.

According to the invention a dilute solution of a carbohydrate xanthogenate containing not more than 5% of cellulose is treated with an aqueous solution of nitrous acid or a salt of nitrous acid in the presence of a weak acid other than an acid derived from an oxide of nitrogen.

The nitrous acid may be added to an acidified solution of the xanthogenate or a salt of nitrous acid may be added to the xanthogenate and the solution acidified afterwards by the addition of a weak acid such as acetic acid. Or the solution of the xanthogenate may be acidified and then added to the nitrous acid solution.

The resultant product will separate out in the form of a porous or spongy precipitate or a porous or spongy mass according to the degree of agitation and the manner of mixing the ingredients together. When a mass is formed it can be very readily broken up into a curdy precipitate and thoroughly washed with water.

Owing to the large volume of gas developed during the process the compound is formed in a very bulky state and in view of the great development of surface obtained thereby the compound has a high degree of reactivity.

The nitric oxide formed during the reaction may be oxidized by exposure to the air and converted into useful products or after oxidization it may be employed for carrying out the invention.

The reaction is apparently expressed by one of the following equations:—

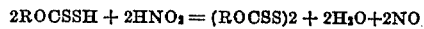
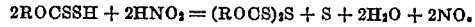

The following example will illustrate the invention but the invention is not limited to this example:—

100 parts of cellulose or starch are treated with 18% solution of caustic soda so as to make 300 parts. The mass is either directly or after some considerable time up to several days, treated at room temperature, with up to 80 parts of carbon disulphide (usually 45 parts) for 4 to 8 hours whereby the carbohydrate is converted into a xanthogenate which is dissolved in cold water to make 2000 to 10000 parts. The cold solution is then neutralized or made acid with acetic acid and then mixed with a solution of 5 to 50 parts of sodium nitrite dissolved in 100 to 2000 parts of water and neutralized with the calculated amount of hydrochloric acid or a slight excess of acetic acid. The solution is vigorously agitated during the mixing operation when the reaction takes place with evolution of nitric oxide which causes the solidifying mixture to expand and finally set into a bulky spongy mass. This is broken up whereby the nitric oxide escapes and is then washed thoroughly with water.

The resulting product obtained by the process forming the invention may be used in a number of ways for a variety of purposes.

By treatment with compounds such as sodium sulphide or sodium sulphite the product swells up considerably and can then be dissolved in caustic soda preferably after removal of the compounds used and applied for the manufacture of films, filaments, filling agents and the like or for the manufacture of other more complex derivatives of carbohydrates.

The process can also be applied for the treatment of fibres, threads, or fabrics of cellulose either completely or partially composed of or converted into xanthogenate thus enabling the thiocarbonyl, $-C=S$, grouping to be fixed to or into the cellulose and so impart novel properties to the fibres, threads or fabrics.

What I claim as my invention and desire to protect by Letters Patent is:—

1. Process for the oxidation of carbohydrate xanthogenates consisting in treating a dilute solution of viscose containing not more than 5% of cellulose with an aqueous solution of nitrous acid in the presence of a weak acid other than an acid derived from an oxide of nitrogen.

2. Process for the oxidation of carbohydrate xanthogenates consisting in treating a dilute solution of viscose containing not more than 5% of cellulose with an aqueous solution of a salt of nitrous acid in the presence of a weak acid other than an acid derived from an oxide of nitrogen.

3. Process for the oxidation of carbohydrate xanthogenates consisting in forming a dilute solution of the carbohydrate xanthogenate which does not contain more than 5% of cellulose, adding an aqueous solution of nitrous acid thereto and finally acidifying with a weak acid other than an acid derived from an oxide of nitrogen.

4. Process for the oxidation of carbohydrate xanthogenates consisting in forming a dilute solution of the carbohydrate xanthogenate which does not contain more than 5% of cellulose, adding an aqueous solution of a salt of nitrous acid thereto and finally acidifying with a weak acid other than an acid derived from an oxide of nitrogen.

5. Process for the oxidation of carbohydrate xanthogenates consisting in forming a dilute solution of the carbohydrate xanthogenate which does not contain more than 5% of cellulose, adding an aqueous solution of nitrous acid thereto and finally acidifying with a solution of acetic acid.

6. Process for the oxidation of carbohydrate xanthogenates consisting in forming a dilute solution of the carbohydrate xanthogenate which does not contain more than 5% of cellulose, adding an aqueous solution of a salt of nitrous acid thereto and finally acidifying with a solution of acetic acid.

7. Process for the production of a solution for the manufacture of fibres, filaments, filling agents and the like consisting in treating a dilute solution of viscose containing not more than 5% of cellulose with an aqueous solution of nitrous acid in the presence of a weak acid other than an acid derived from an oxide of nitrogen, then treating the product with a sulphur containing compound of an alkali metal which compound when in solution has the power of dissolving free sulphur to cause the product to swell up and finally dissolving in an alkaline solution.

8. Process for the production of a solution for the manufacture of fibres, filaments, filling agents and the like consisting in treating a dilute solution of viscose containing not more than 5% of cellulose with an aqueous solution of a salt of nitrous acid in the presence of a weak acid other than an acid derived from an oxide of nitrogen, then treating the product with a sulphur containing compound of an alkali metal which compound when in solution has the power of dissolving free sulphur to cause the product to swell up and finally dissolving in an alkaline solution.

9. Process for the production of a solution for the manufacture of fibres, filaments, filling agents and the like consisting in treating a dilute solution of viscose containing not more than 5% of cellulose with an aqueous solution of nitrous acid in the presence of a weak acid other than an acid derived from an oxide of nitrogen, then treating the product with sodium sulphide and finally dissolving in an alkaline solution.

10. Process for the production of a solution for the manufacture of fibres, filaments, filling agents and the like consisting in treating a dilute solution of viscose containing not more than 5% of cellulose with an aqueous solution of a salt of nitrous acid in the presence of a weak acid other than an acid derived from an oxide of nitrogen, then treating the product with a salt of nitrous acid in the presence of a weak acid other than an acid derived from an oxide of nitrogen and then treating the product with sodium sulphide and finally dissolving in an alkaline solution.

11. A solution for the manufacture of films, filaments and filling agents produced by the oxidation of a dilute solution of viscose containing not more than 5% of cellulose with an aqueous solution of nitrous acid in the presence of a weak acid other than an acid derived from an oxide of nitrogen, treating the oxidized product with a sulphur containing compound of an alkali metal which compound when in solution has the power of dissolving free sulphur to cause it to swell up and finally dissolving the swollen product in an alkaline solution.

12. A solution for the manufacture of films, filaments and filling agents produced by the oxidation of a dilute solution of viscose containing not more than 5% of cellulose with an aqueous solution of a salt of nitrous acid in the presence of a weak acid other than an acid derived from an oxide of nitrogen, treating the oxidized product with a sulphur containing compound of an alkali metal which compound when in solution has the power of dissolving free sulphur to cause it to swell up and finally dissolving the swollen product in an alkaline solution.

13. A solution for the manufacture of films, filaments and filling agents produced by the oxidation of a dilute solution of viscose containing not more than 5% of cellulose with nitrous acid in the presence of acetic acid, treating the oxidized product with a sulphur containing compound of an alkali metal compound when in solution which has the power of dissolving free sulphur to cause it to swell up and finally dissolving the swollen product in an alkaline solution.

14. A solution for the manufacture of films, filaments and filling agents produced by the oxidation of a dilute solution of viscose containing not more than 5% of cellulose with an aqueous solution of a salt of nitrous acid in the presence of acetic acid, treating the oxidized product with a sulphur containing compound of an alkali metal which compound when in solution has the power of dissolving free sulphur to cause it to swell up and finally dissolving the swollen product in an alkaline solution.

In testimony whereof I have hereunto set my hand.

WILLIAM HARRISON.